United States Patent
Toivanen et al.

(10) Patent No.: US 9,385,787 B2
(45) Date of Patent: Jul. 5, 2016

(54) COMMUNICATIONS VIA WIRELESS CHARGING

(71) Applicant: Nokia Corporation, Espoo (FI)

(72) Inventors: Timo Juhani Toivanen, Mäntsälä (FI); Jarmo Ilkka Saari, Turku (FI)

(73) Assignee: Nokia Technologies Oy, Espoo (FI)

(*) Notice: Subject to any disclaimer, the term of this patent is extended or adjusted under 35 U.S.C. 154(b) by 188 days.

(21) Appl. No.: 14/167,480

(22) Filed: Jan. 29, 2014

(65) Prior Publication Data
US 2015/0215005 A1    Jul. 30, 2015

(51) Int. Cl.
H04B 5/00 (2006.01)
H02J 7/02 (2016.01)
H02J 7/00 (2006.01)
H02J 5/00 (2016.01)
H02J 17/00 (2006.01)

(52) U.S. Cl.
CPC .............. *H04B 5/0037* (2013.01); *H02J 5/005* (2013.01); *H02J 7/0004* (2013.01); *H02J 7/025* (2013.01); *H02J 17/00* (2013.01); *H04B 5/0093* (2013.01)

(58) Field of Classification Search
CPC ......... H02J 17/00; H02J 7/0044; H04M 1/04; H04M 455/572; H04B 1/3883
USPC .............. 455/573, 572, 343.1, 41.1; 320/108, 320/127
See application file for complete search history.

(56) References Cited

U.S. PATENT DOCUMENTS

| | | | | |
|---|---|---|---|---|
| 5,710,885 A * | 1/1998 | Bondi | ............... | H04L 41/12 709/224 |
| 6,097,292 A * | 8/2000 | Kelly | ............... | G06K 7/0008 235/385 |
| 6,487,680 B1 * | 11/2002 | Skazinski | ............... | G06F 11/0727 714/23 |
| 6,697,097 B1 * | 2/2004 | Parker | ............... | H04L 29/12018 348/14.08 |
| 7,830,816 B1 * | 11/2010 | Gonzalez | ............... | H04L 41/5009 370/245 |
| 7,940,667 B1 * | 5/2011 | Coady | ............... | H04J 3/0691 342/102 |
| 8,686,662 B1 * | 4/2014 | Bragg | ............... | H02J 7/345 315/159 |
| 8,995,548 B2 * | 3/2015 | Kloos | ............... | H04L 5/0048 375/260 |
| 2001/0033607 A1 * | 10/2001 | Fleming | ............... | G01S 5/0072 375/150 |
| 2002/0127988 A1 * | 9/2002 | Humes | ............... | H03L 7/093 455/260 |
| 2005/0128950 A1 * | 6/2005 | Hall | ............... | H04L 12/44 370/235 |

(Continued)

FOREIGN PATENT DOCUMENTS

WO    2008/036971 A2    3/2008
WO    2013/076353 A1    5/2013

OTHER PUBLICATIONS

Extended European Search Report received for corresponding European Patent Application No. 15152768.6, dated Jul. 13, 2015, 6 pages.

(Continued)

*Primary Examiner* — Lewis West
(74) *Attorney, Agent, or Firm* — Nokia Technologies Oy (57) ABSTRACT

Methods and apparatus, including computer program products, are provided for wireless charging. In some example embodiments, there is provide a method. The method may include receiving, at a power receiver, a first ping message and a second ping message; detecting, at the power receiver, a first time between transmissions of the first ping message and the second ping message; and decoding, at the power receiver, the first time into a data value representative of a transmitted data value sent by a power transmitter. Related apparatus, systems, methods, and articles are also described.

16 Claims, 7 Drawing Sheets

(56) References Cited

U.S. PATENT DOCUMENTS

| | | | |
|---|---|---|---|
| 2006/0077960 A1* | 4/2006 | Chang | H04L 29/06027 370/352 |
| 2009/0213828 A1* | 8/2009 | Brundage | G01S 5/0289 370/338 |
| 2010/0259217 A1* | 10/2010 | Baarman | H02J 5/005 320/108 |
| 2011/0043707 A1* | 2/2011 | Umezu | H04N 21/4122 348/723 |
| 2011/0090762 A1* | 4/2011 | Rhodes | H04B 11/00 367/131 |
| 2011/0134881 A1* | 6/2011 | Sanders | H04W 36/30 370/331 |
| 2011/0319071 A1* | 12/2011 | Beppler | H04W 48/18 455/424 |
| 2012/0112552 A1* | 5/2012 | Baarman | H05K 9/002 307/104 |
| 2012/0119708 A1* | 5/2012 | Toya | H01F 38/14 320/137 |
| 2012/0120871 A1* | 5/2012 | Jaeger | H04W 74/002 370/328 |
| 2013/0038358 A1* | 2/2013 | Cook | G01V 1/26 327/141 |
| 2013/0070582 A1* | 3/2013 | Joo | H04W 52/0229 370/216 |
| 2013/0300206 A1* | 11/2013 | Kim | H04B 5/0037 307/104 |
| 2013/0313910 A1* | 11/2013 | Sasaki | H02J 7/025 307/104 |
| 2014/0051949 A1* | 2/2014 | Old | A61B 5/0002 600/302 |
| 2014/0094116 A1* | 4/2014 | Walley | H02J 7/025 455/41.1 |
| 2014/0103865 A1* | 4/2014 | Van Wiemeersch | H02J 17/00 320/108 |
| 2014/0197782 A1* | 7/2014 | Graf | H04B 15/04 320/108 |
| 2014/0232199 A1* | 8/2014 | Jung | H02J 5/005 307/104 |
| 2014/0258443 A1* | 9/2014 | Stone | H04L 65/605 709/217 |
| 2014/0286318 A1* | 9/2014 | Senoo | H04W 72/1268 370/336 |
| 2014/0306657 A1* | 10/2014 | Lundgren | H02J 7/025 320/108 |
| 2015/0097438 A1* | 4/2015 | Aioanei | H02J 7/025 307/104 |
| 2015/0134864 A1* | 5/2015 | Foster | G06F 13/4286 710/106 |
| 2015/0236539 A1* | 8/2015 | Park | H02J 7/0044 455/573 |

OTHER PUBLICATIONS

"Nokia DT-900 Wireless Charging Platform", Nokia, Retrieved on Apr. 17, 2014, Webpage available at : http://www.nokia.com/fi-fi/lisalaitteet/lisalaite/dt-900/.

"System Description Wireless Power Transfer", vol. I: Low Power, Part 1: Interface Definition, Qi Standard, Version 1.1.2, Jun. 2013, pp. 1-186.

* cited by examiner

COMMUNICATIONS VIA WIRELESS CHARGING

FIELD

The subject matter described herein relates to wireless charging.

BACKGROUND

Wireless charging refers to a power transmitter transferring energy wirelessly to a power receiver. For example, a power transmitter may be implemented as a so-called charging plate. In this example, when another device is placed on the charging plate, the power transmitter transfers energy to the other device (i.e., the power receiver). In this way, the other device can be charged. Wireless charging may work based on the principle of inductive charging, although other technologies may be used as well including magnetic resonance base charging. The power transmitter may include a primary coil which when energized induces an electromagnetic field into the adjacent secondary coil in the power receiver.

SUMMARY

Methods and apparatus, including computer program products, are provided for wireless charging. In some example embodiments, there is provide a method. The method may include receiving, at a power receiver, a first ping message and a second ping message; detecting, at the power receiver, a first time between transmissions of the first ping message and the second ping message; and decoding, at the power receiver, the first time into a data value representative of a transmitted data value sent by a power transmitter.

In some variations, one or more of the features disclosed herein including the following features can optionally be included in any feasible combination. The first ping message may be received from a secondary coil at the power receiver. The power receiver may send an indication to enter a communication phase to enable the transmissions of the first ping message and the second ping message. The communication phase may include a calibration phase to determine at least a round trip time associated with at least one ping message. The power receiver may send a terminate indication to the power transmitter to cease the communication phase and to enable an identification and configuration phase. The power receiver may decode a detected third time between transmissions of the second ping message and a third ping message.

In some other example embodiments, there is provide a method. The method may include receiving, by a power transmitter, a data value; encoding, by the power transmitter, the received data value into a first time between transmissions of a first ping message and a second ping message; and sending, by the power transmitter, the first ping message and the second ping message according to the encoded first time between transmissions.

In some variations, one or more of the features disclosed herein including the following features can optionally be included in any feasible combination. The sending of the second ping message may be delayed until the first time to encode the data value. The power transmitter may receive at least one of an indication to enter a communication phase and a termination indication to cease the communication phase.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Wireless power transmission may be used to wirelessly transfer power from a power transmitter to a power receiver, without a wired connection between the transmitter and receiver. Specifically, the power transmitter may use inductive coupling to transfer power from a primary coil at the power transmitter to an adjacent secondary coil at the power receiver. In this way, the power transmitter can for example transfer power to charge the power receiver's battery.

To provide interoperability between devices, the Wireless Power Consortium has implemented the Qi wireless charging standard, System Description, Wireless Power Transfer, Volume I: Low Power, Part 1: Interface Definition, Version 1.1.2, June 2013, hereinafter the Qi standard. In the case of Qi standard compliant devices, Qi may define the process for power transfer to the power receiver. Specifically, the power transmitter may send a ping to detect the presence of an object, such as a power receiver, proximate to the power transmitter. The ping may be a beacon or a packet indicating that a response is required from the recipient. In some example embodiments, the ping may be a digital ping in accordance with the Qi standard. For example, the digital ping may comprise a power signal applied in order to detect and identify a power receiver. When a device is detected via the ping and a subsequent response from the power receiver, an identification and configuration phase takes place, during which the power receiver sends packets to the power transmitter. These packets may identify the power receiver and/or provide configuration and setup information to the power transmitter. Next, the power transfer phase begins. During power transfer, the power transmitter's primary coil may induce a power transfer to the power receiver's secondary coils (which is usually less than about 5 millimeters from the primary coil although greater distances may be realized as well). Moreover, the power receiver may send control/error packets requesting an increase or decrease in power from the power transmitter. When the power receiver sends an end power message to the power transmitter, the power transmitter may cease the power transfer. In Qi standard compliant devices, data communication, such as the control/error message, is unidirectional from the power receiver to the power transmitter.

In some example embodiments, there may be provided a communication protocol to allow data communication from the power transmitter to the power receiver. Moreover, the data communication from the power transmitter to the power receiver may, in some example embodiments, be performed by for example modulating the time delay between pings and/or the time delay between a response to a ping and a subsequent ping.

Figure 1:
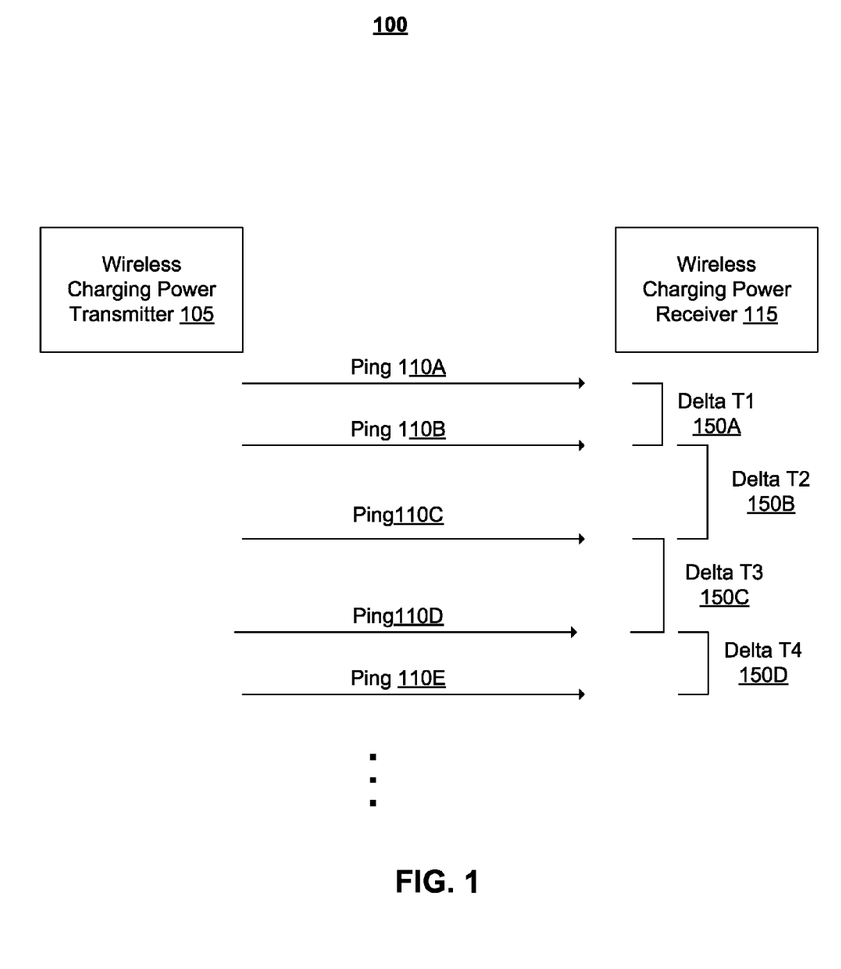
FIG. 1 depicts an example of a process for communicating from a power transmitter to a power receiver by modulating time between pings, in accordance with some example embodiments.

FIG. 1 depicts an example system 100 including a power transmitter 105 and a power receiver 115, in accordance with some example embodiments.

In the example of FIG. 1, power transmitter 105 may encode a first time delay T1 150A between pings 110A-B to represent a first value, and encode a second time delay T2 150B between pings 110B-C to represent a second value. In this way, power transmitter 105 may vary the time delay to encode and thus communicate information (for example, data) sent to power receiver. This communication may be carried from the power transmitter's primary coil to the power receiver's secondary coil.

To illustrate further, to send the following data "1001" power transmitter 105 may send ping 110A and 110B, so that the time between pings is 400 milliseconds (which may represent a value of "1" at delta T1 150A). Ping 110C may be sent 500 milliseconds later (which may represent a value of "0" at delta T2 150B). Ping 110D may be sent 500 milliseconds after ping 110C (which may represent a value of "0" at delta T3 150C), and ping 110E may be sent 400 milliseconds after ping 110D (which may represent a value of "1" at delta T4 150D).

Although the previous example used specific time delays and a data value of "1001," other time delays and data values may be used as well. Moreover, although the previous example encoded the delays into a binary coding scheme, other coding may be used as well. In addition, although some of the examples provided herein refer to specific standards, such as the Qi standard, the subject matter herein may be used with other wireless charging standards and wireless charging technologies as well.

Figure 2:
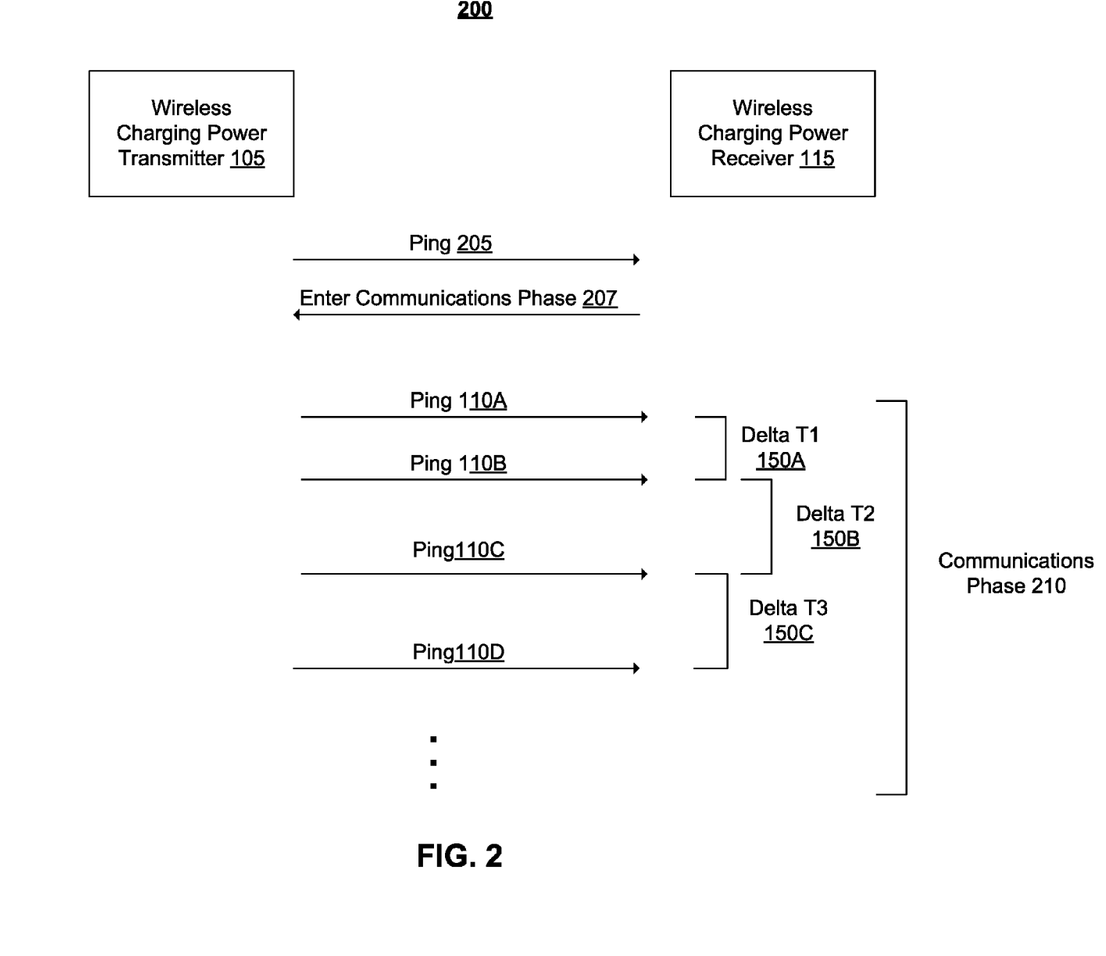
FIG. 2 depicts another example of a process for communicating from a power transmitter to a power receiver by modulating time between pings, in accordance with some example embodiments.

FIG. 2 depicts an example process 200 for modulating time delay between pings to provide data communications between a power transmitter 105 and a power receiver 115, in accordance with some example embodiments.

In the example of FIG. 2, power transmitter 105 may send, at 205, a ping message to the power receiver 115, in accordance with some example embodiments. This ping may be an analog and/or digital ping, in accordance with the Qi standard.

At 207, power receiver 115 may respond to the ping by sending an indication to the power transmitter 105 to enter a communications phase, in accordance with some example embodiments. For example, power receiver 115 may, in response to the ping, send a packet to power transmitter 105, and this packet may indicate to the power transmitter 105 to enter a communication phase 210, during which time delays between pings are modulated/varied to provide data communications from power transmitter 105 to power receiver 115. For example, certain time delays between pings may be used to encode data transmitted to the power receiver, which decodes the time delays into the data values.

Rather than enter an identification and configuration phase, power transmitter may, at 210, thus enter communication phase 210 enabling the power transmitter to send data to power receiver 115, in accordance with some example embodiments. For example, power transmitter may modulate/vary the time between pings at 150A-C to encode and thus communicate data between the transmitter and receiver. Specifically, the time delay between pings sent by power transmitter 105 may be received by the receiver 115 and decoded into a data output value. These pings may be sent wirelessly from the power transmitter to the power receiver via the power transmitter's primary coil and the power receiver's secondary coil.

Figure 3:
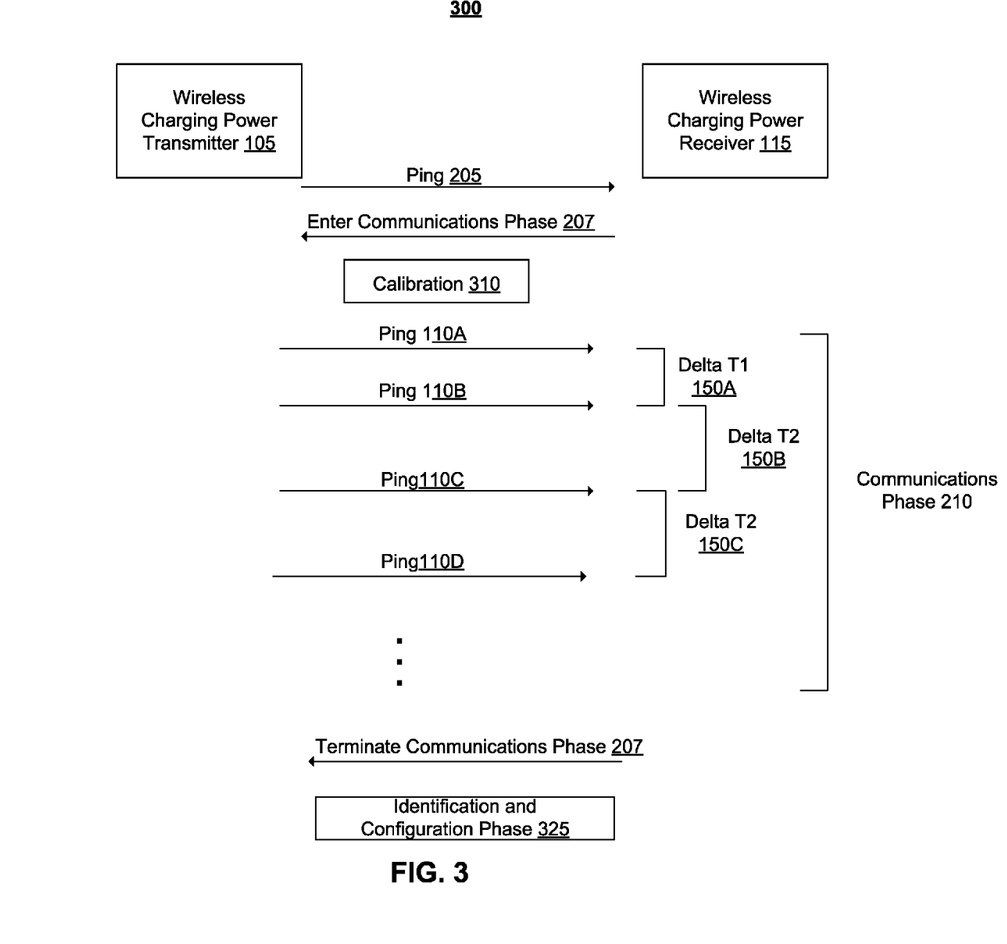
FIG. 3 depicts yet another example of a process for communicating from a power transmitter to a power receiver by modulating time between pings, in accordance with some example embodiments.

FIG. 3 depicts another example process 300 for modulating/varying time delay between pings to provide a data communication channel between a power transmitter 105 and a power receiver 115, in accordance with some example embodiments.

At 205, power transmitter 105 may send a ping message to the power receiver 115, in accordance with some example embodiments.

At 207, the power receiver 115 may send an indication to the power transmitter to enter a communications phase 210, in accordance with some example embodiments. For example, power receiver 115 may, in response to the ping, indicate that power transmitter 105 should enter the communication phase 210. Moreover, the power receiver 115 may indicate other information as well, such as a received signal strength indicator (RSSI) packet indicative of the strength of the received ping. In the case of Qi, it may allow a proprietary packet to be sent to the transmitter but Qi may require the receiver to move directly into a charging phase right the proprietary packet is sent. The subject matter disclosed herein may, in some example embodiments, allow a communication phase where continuing communications is enabled (for example, proprietary packet sent to the transmitter and transmitter to receiver communications based on delay), delaying thus the charging phase.

A 310, a calibration may be performed, in accordance with some example embodiments. For example, power transmitter 105 may monitor how long it takes the power receiver to respond to a ping. For example, when the power transmitter sends a ping, the power receiver may respond at a certain time to the ping. This response time may be monitored during the calibration phase 310 to determine the round trip delay time associated with a given power receiver as that time may vary from power receiver to power receiver. To illustrate, if it takes the power receiver milliseconds on average to respond to a ping, the power transmitter may take that time into account when determining the time delay values 150A-C used to encode data communications. Referring to the previous example, the first time delay may in this example be set to 250 and the second delay to 750 milliseconds, although other delay values may be used as well. Thus, when a time delay between pings is 250 milliseconds, that time delay may be decoded by the power receiver 115 as a first value (for example, a binary "0"), and when the time delay is 750 milliseconds between pings, the power receiver 115 may decode that delay as a second value (for example, a binary "1"). Although the previous example provide examples of times, other time values may be used as well. For example, the round trip time may be measured as 200 milliseconds, and, as such, the first delay may be coded as 150 milliseconds and the second delay may be encoded at 250 milliseconds.

In some example embodiments, the receiver to transmitter ping response time may vary. Although the ping response time may be within standard dictated limits, the response time may vary and thus measured during the calibration phase a given combination of transmitter and receiver. This calibration may provide the opportunity to make (for example, negotiate) communication parameters in which a statistical distribution of ping delay is determined via the measurement. As such, the distribution of the ping delay may be used to select delay times, thresholds, number of states, and the like.

Once the calibration phase 310 determines the appropriate values for the delays 150A-C, the pings 110A-D may be sent in accordance with those calibrated delays. For example, power transmitter 105 may encode a data value to be transmitted to the receiver by delaying the transmission of a ping (for example, by 750 milliseconds to convey a "1" or 250 milliseconds to convey a "0").

In some example embodiments, the delays may be determined based on a calibration as noted. However, the delays and their corresponding values may be determined without the above-noted calibration phase as well. Moreover, the delay values may be predetermined in for example a standard. In addition, the coding scheme for the delay values may be signaled by a network (and/or the power transmitter) to the receiver In some example embodiments, the power receiver 115 may send, at 207, a message indicating an end to the communication phase 210. When this is the case, the power transmitter may stop communicating and enters an identification and configuration phase 325 in accordance with the Qi standard. In some example embodiments, the power transmitter 105 may send during the communication phase 210 an indication of an end of the data communication (for example, when there is no data to be sent to receiver 115), which when decoded by power receiver 115 results in a response, such as terminate communications phase at 207. Termination may also be concluded based on the interrupted transmission on one or both sides. For example, if there are no communication for a certain period of time (for example, 10 seconds although other times may be used as well), then the communication phase may terminate and return to for example, another phase such as a ping phase state and/or an identification and configuration phase according to the Qi standard.

Figure 4:
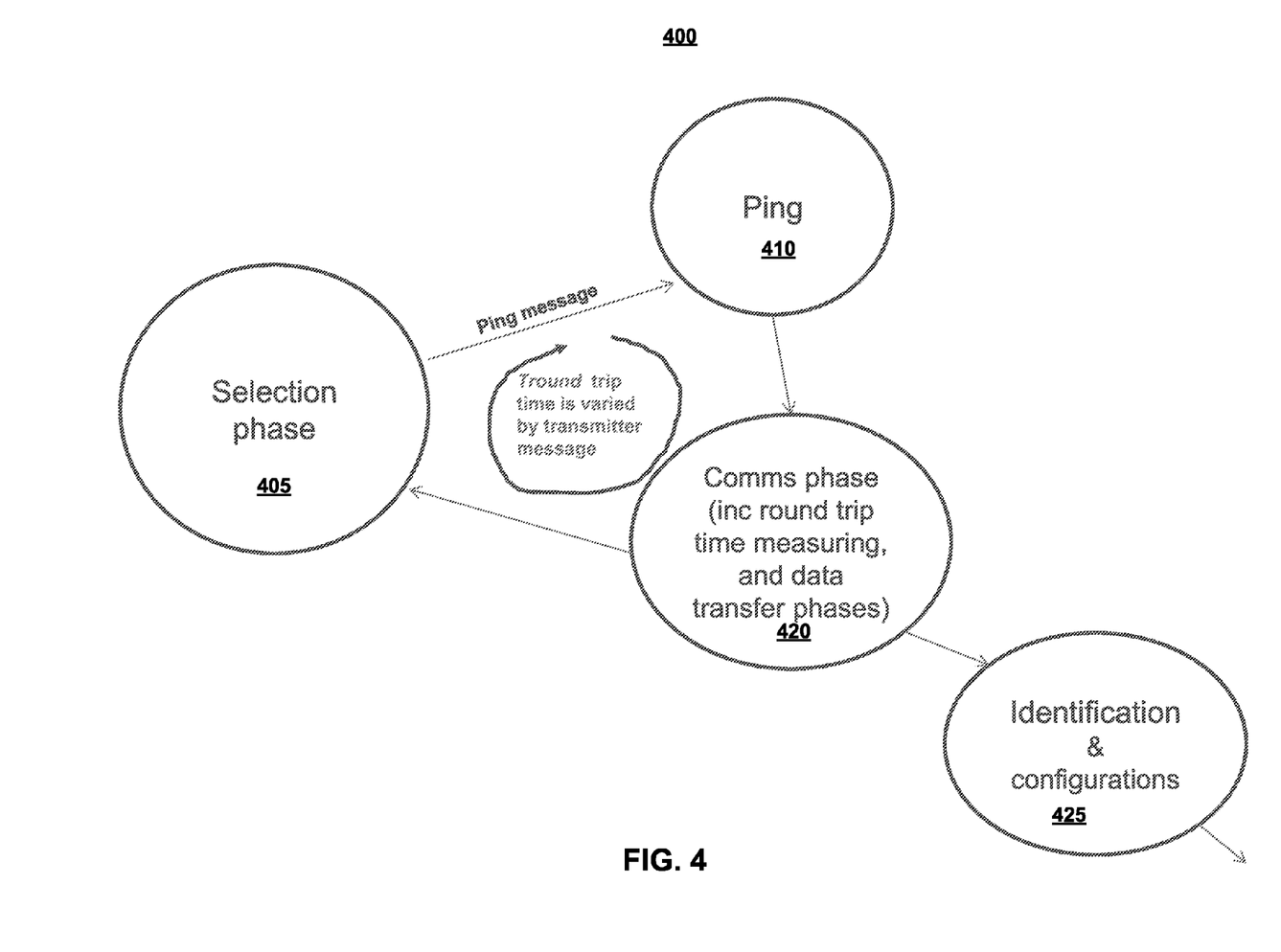
FIG. 4 depicts a state diagram including a communication phase for communicating from a power transmitter to a power receiver by modulating time between pings, in accordance with some example embodiments.

FIG. 4 depicts an example of a state diagram 400, in accordance with some example embodiments. The state diagram 400 may include a selection phase 405 during which the power transmitter may send one or more ping messages; a response to ping messages phase 410 when for example response 207 may be sent by the power receiver; a communication phase 420 during which the power transmitter may communicate with the power receiver based on the encoded time delays between pings; and a subsequent identification and configuration phase 425. In some example embodiments, the round trip time (Tround at FIG. 4) may be varied to modulate information. This round trip time may include for example the time from when an initial ping is sent until a response is received from a power receiver and/or another ping is sent.

Figure 5:
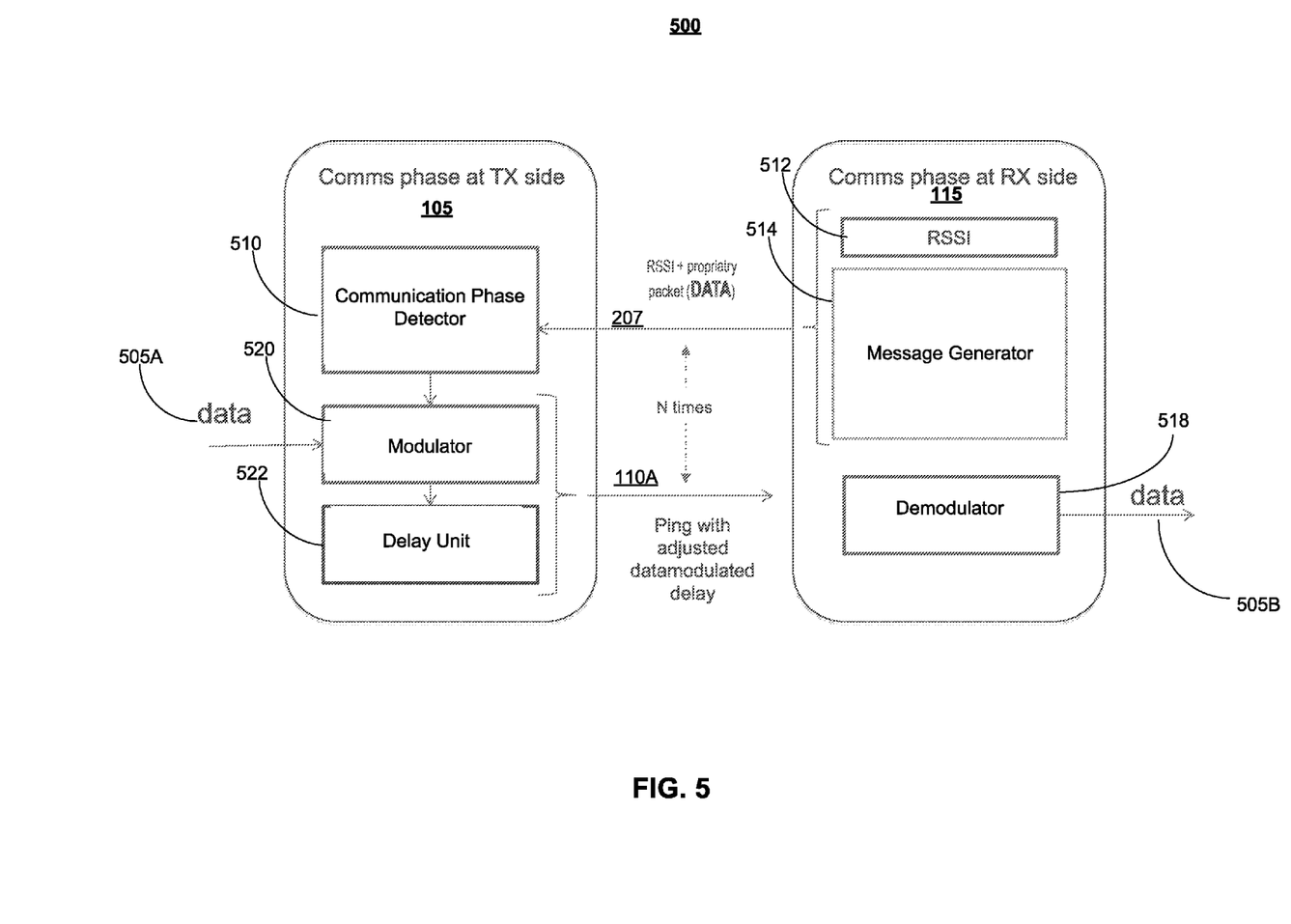
FIG. 5 depicts examples of a power transmitter and a power receiver, in accordance with some example embodiments.

FIG. 5 depicts another example of the power transmitter 105 and power receiver 115, in accordance with some example embodiments.

The power transmitter 105 may include a communication phase detector 510 to detect for example an enter communication phase message 207 and the like sent by power receiver 115. The communication phase detector 510 may also detect packets sent by the receiver 115 including packets related to the calibration phase, modulation configuration (for example, delay times and corresponding values), acknowledgment messages, and the like. The power transmitter 105 may also include a modulator 520 to encode received data 505A by varying the time delay. For example, if the modular 520 is configured to have 2 delay states (for example, S=2), the modulator 520 may convey one or more binary data bits using two delay states (as noted in the examples above). Power transmitter 105 may include a delay unit 522 to delay the ping transmission in order to encode the received data 505A.

The power receiver 115 may include a message generator 514 to generate messages, such as an enter communication phase message 207, generate a start and/or stop calibration phase message, generate a modulation configuration message (for example, number of states, data length, delays used for coding and the like), generate an indication regarding the amount of data (N) to transmit during the communications phase, and generate acknowledgement messages in response to successful receipt of data. The generated message may also include RSSI information 512. Power receiver 512 may also include a demodulator 518 to decode the time delays of the received pings into data output 505B.

To illustrate, power transmitter 105 may be in a communication phase after receiving enter communication phase message 207 (which may be detected by communication phase detector 510). Power transmitter 105 may have data 505A, such as "1110" to transmit to power receiver 105. When this is the case, modulator 520 may encode the data, so that the ping 110A (and subsequent pings) is delayed. For example, if there are two delay states such as 200 milliseconds and 300 milliseconds, a "0" may be encoded by modulator 520 with a delay of 200 milliseconds, and a "1" may be encoded by modulator 520 with a delay of 300 milliseconds. In this example in which the data is "1110," the delay unit 522 may delay the first ping 110A by 300 milliseconds, the second ping by 300 milliseconds, the third ping by 300 milliseconds, and the fourth ping by 200 milliseconds. The demodulator 518 at power receiver 115 may demodulate/decode the delays into "1110," which may represent data output 505B.

Figure 6A:
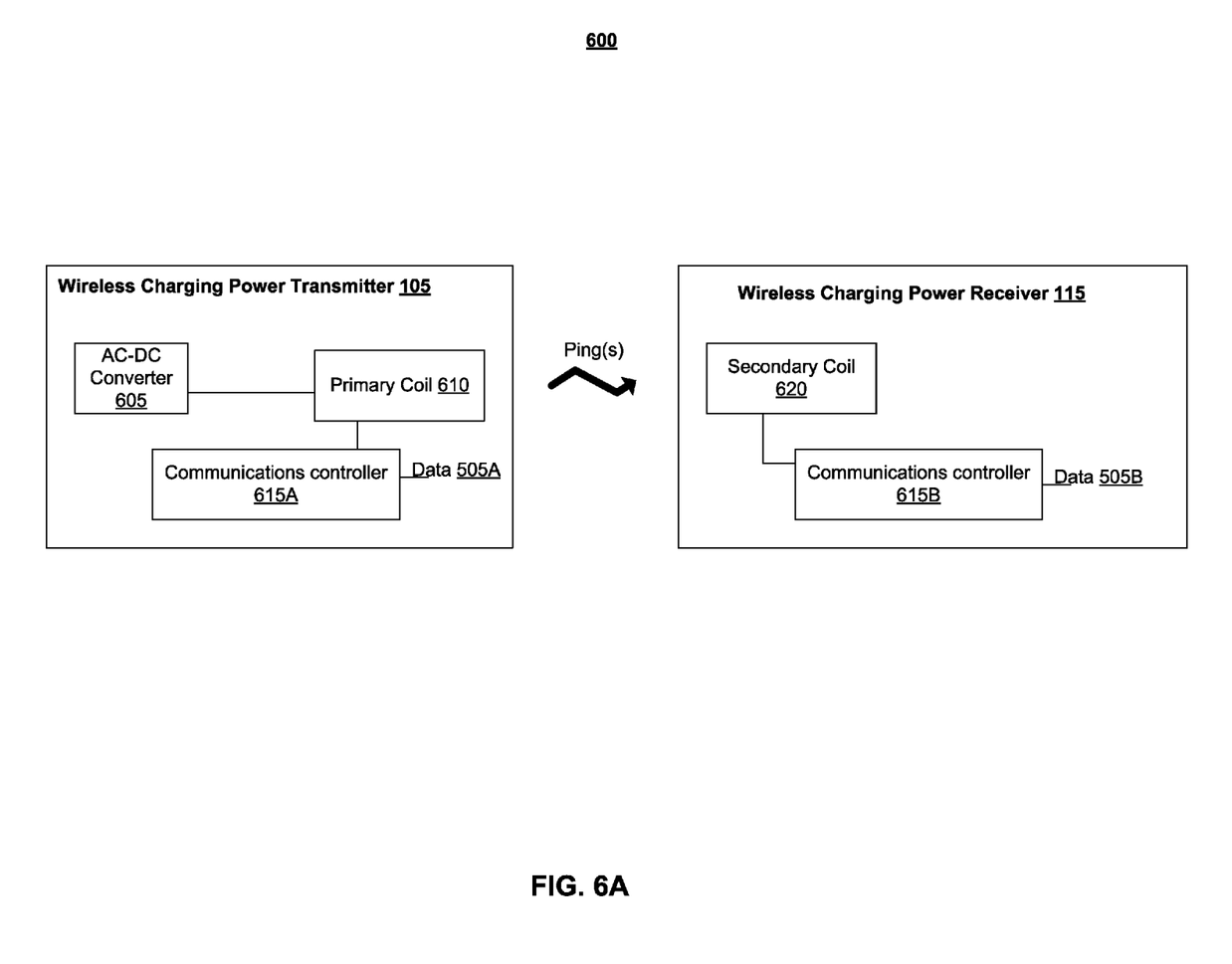
FIG. 6A depicts additional examples of a power transmitter and a power receiver, in accordance with some example embodiments.

FIG. 6A depicts a system 600 including a wireless power transmitter 105 and a wireless power receiver 115, in accordance with some example embodiments. Power reliever 105 may include an AC-DC converter 605 to provide power to a primary coil 610. This coil may induce power, during a charging phase, into secondary coil 620 of the power receiver 115. The power transmitter 105 may also include a communications controller 615A. The communication controller 615A may perform one or more of the operations disclosed herein with respect to modulating/varying time delay between pings to encode data for transmission between transmitter 105 and receiver 115. Communication controller 615A may also provide the ping messages to be carried from the primary coil 610 to the secondary coil 620 and detect messages 207 and the like sent from the secondary coil 620 to primary coil 610. The power receiver 115 may also include a communications controller 615A. Power receiver 115 may also include a communication controller 615B which may perform one or more of the operations disclosed herein with respect to decoding the time delay between pings to provide data out 505B. Communication controller 615B may also receive the ping messages carried from the primary coil 610 to the secondary coil 620, send messages 207 and the like from the secondary coil 620 to primary coil 610, decode the time delays between pings, and the like.

Figure 6B:
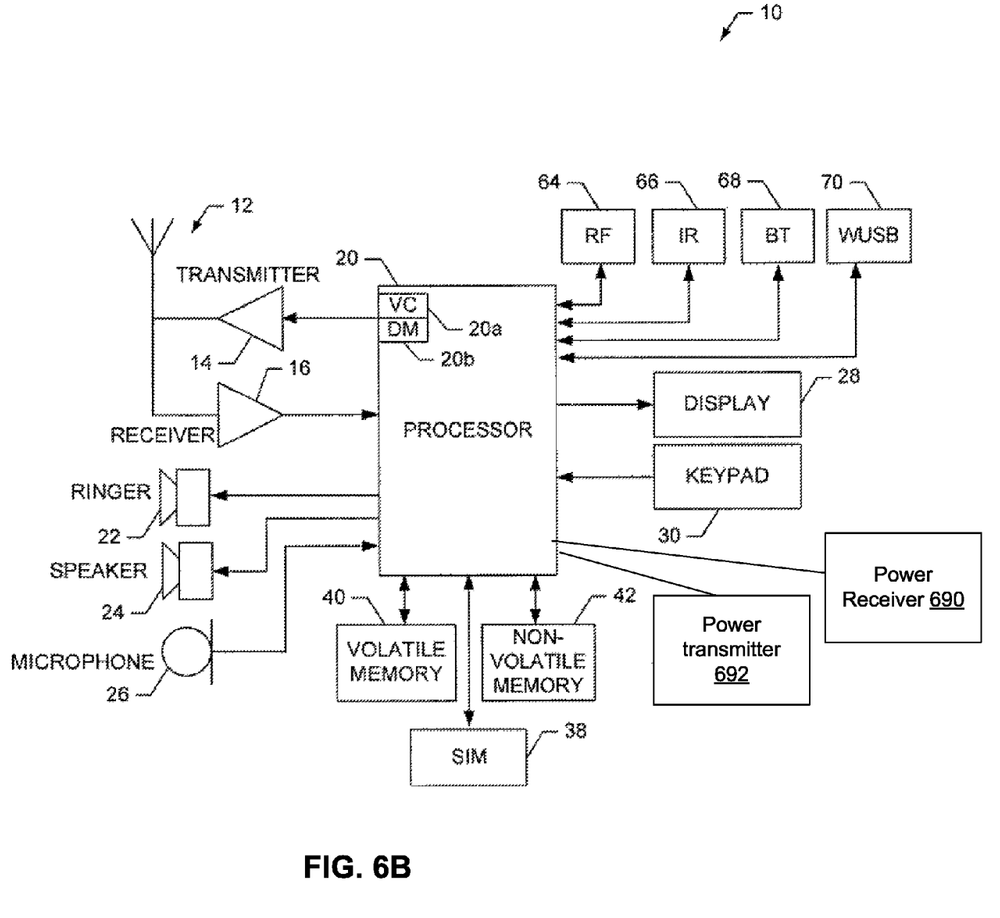
FIG. 6B depicts an example of a user equipment including a power receiver, in accordance with some example embodiments.

FIG. 6B illustrates a block diagram of an apparatus 10, in accordance with some example embodiments. For example, apparatus 10 may comprise a radio, such as a user equipment, a smart phone, mobile station, a mobile unit, a subscriber station, a wireless terminal, a tablet, a wireless plug-in accessory, a wireless access point, a base station, and/or or any other device with device having a transceiver.

In some example embodiments, apparatus 10 may include a wireless charging receiver 690, which may be implemented as disclosed herein with respect to the power receivers including perform one or more of the operations disclosed herein, such as decoding the time delay between pings to provide a data out, generating enter/terminate communication phase messages, and the like. Apparatus 10 may also include a power transmitter 692 as well.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6B as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing the functions of the apparatus including receiving a first ping message and a second ping message; detecting a first time between transmissions of the first ping message and the second ping message; and decoding the first time into a data value representative of a transmitted data value sent by a power transmitter. The memories may comprise an identifier, such as an international mobile equipment identification (IMEI) code, capable of uniquely identifying apparatus 10. The functions may include one or more of the operations disclosed herein with respect to communicating from a power transmitter to a power receiver based on modulation of time delays. The memories may comprise an identifier, such as an international mobile equipment identification (IMEI) code, capable of uniquely identifying apparatus 10. In the example embodiment, the processor 20 may be configured using computer code stored at memory 40 and/or 42 to operations disclosed herein with respect to the power transmitter and/or power receiver including receiving, at a power receiver, a first ping message and a second ping message, detecting, at the power receiver, a first time between transmission of the first ping message and the second ping message, decoding, at the power receiver, the first time into a data value representative of a transmitted data value sent by a power transmitter, modulating the time delay of pings in order to communicate information from a power transmitter to a power receiver, and sending delayed pings, and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6B, computer-readable medium may comprise a non-transitory computer-readable storage medium that may be any media that can contain or store the instructions for use by or in connection with an instruction execution system, apparatus, or device, such as a computer. For example, the computer-readable medium may include computer program code which when executed by processor circuitry may provide operations disclosed herein with respect to the power transmitter and/or power receiver.

Without in any way limiting the scope, interpretation, or application of the claims appearing below, a technical effect of one or more of the example embodiments disclosed herein is allowing the power transmitter to send information to the power receiver without requiring another communication mechanism, such as Bluetooth, NFC, and the like.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method comprising:
  receiving, at a power receiver, a first ping message and a second ping message, wherein the first ping message is received from a secondary coil at the power receiver;
  detecting, at the power receiver, a first time between transmissions of the first ping message and the second ping message; and
  decoding, at the power receiver, the first time into a data value representative of a transmitted data value sent by a power transmitter.

2. The method of claim 1 further comprising:
  sending, by the power receiver, an indication to enter a communication phase to enable the transmissions of the first ping message and the second ping message.

3. The method of claim 2, wherein the communication phase includes a calibration phase to determine at least a round trip time associated with at least one ping message.

4. The method of claim 2 further comprising:
sending, by the power receiver, a terminate indication to the power transmitter to cease the communication phase and to enable an identification and configuration phase.

5. The method of claim 1 further comprising:
decoding, at the power receiver, a detected third time between transmissions of the second ping message and a third ping message.

6. A method comprising:
receiving, by a power transmitter, a data value;
encoding, by the power transmitter, the received data value into a first time between transmissions of a first ping message and a second ping message; and
sending, by the power transmitter, the first ping message and the second ping message according to the encoded first time between transmissions;
wherein the sending of the second ping message is delayed until the first time to encode the data value.

7. The method of claim 6 further comprising:
receiving, by the power transmitter, at least one of an indication to enter a communication phase and a termination indication to cease the communication phase.

8. An apparatus comprising:
at least one processor; and
at least one memory including computer program code, the at least one processor, the at least one memory, and the computer program code configured to cause the apparatus to at least:
receive a first ping message and a second ping message, wherein the first ping message is received from a secondary coil at the power receiver;
detect a first time between transmissions of the first ping message and the second ping message; and
decode the first time into a data value representative of a transmitted data value sent by a power transmitter.

9. The apparatus of claim 8, wherein the apparatus is further configured to at least send an indication to enter a communication phase to enable the transmissions of the first ping message and the second ping message.

10. The apparatus of claim 9, wherein the communication phase includes a calibration phase to determine at least a round trip time associated with at least one ping message.

11. The apparatus of claim 9, wherein the apparatus is further configured to at least send a terminate indication to the power transmitter to cease the communication phase and to enable an identification and configuration phase.

12. The apparatus of claim 8, wherein the apparatus is further configured to at least decode a detected third time between transmissions of the second ping message and a third ping message.

13. An apparatus comprising:
at least one processor; and
at least one memory including computer program code, the at least one processor, the at least one memory, and the computer program code configured to cause the apparatus to at least:
receive a data value;
encode the received data value into a first time between transmissions of a first ping message and a second ping message; and
send the first ping message and the second ping message according to the encoded first time between transmissions;
wherein the sending of the second ping message is delayed until the first time to encode the data value.

14. The apparatus of claim 13, wherein the apparatus is further configured to at least receive at least one of an indication to enter a communication phase and a termination indication to cease the communication phase.

15. A non-transitory computer-readable medium encoded with instructions that, when executed by at least one processor, perform at least the following:
receiving, at a power receiver, a first ping message and a second ping message, wherein the first ping message is received from a secondary coil at the power receiver;
detecting, at the power receiver, a first time between transmissions of the first ping message and the second ping message; and
decoding, at the power receiver, the first time into a data value representative of a transmitted data value sent by a power transmitter.

16. A non-transitory computer-readable medium encoded with instructions that, when executed by at least one processor, perform at least the following:
receiving, by a power transmitter, a data value;
encoding, by the power transmitter, the received data value into a first time between transmissions of a first ping message and a second ping message; and
sending, by the power transmitter, the first ping message and the second ping message according to the encoded first time between transmissions;
wherein the sending of the second ping message is delayed until the first time to encode the data value.

\* \* \* \* \*